US008923123B2

(12) United States Patent  (10) Patent No.: US 8,923,123 B2
Kulkarni et al.  (45) Date of Patent: Dec. 30, 2014

(54) ECN-ENABLED MULTICAST PROTOCOL FOR WIRELESS COMMUNICATION SYSTEMS UNDER BLOCKAGE

(71) Applicant: Lockheed Martin Corporation, Bethesda, MD (US)

(72) Inventors: Amit Kulkarni, Clifton Park, NY (US); Xiaogang Wang, Cambridge, MA (US); Orhan Cagri Imer, Boston, MA (US); Anshul Kantwala, Frederick, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 168 days.

(21) Appl. No.: 13/668,115

(22) Filed: Nov. 2, 2012

(65) Prior Publication Data

US 2014/0126357 A1  May 8, 2014

(51) Int. Cl.
$H04L\ 12/26$ (2006.01)
$H04H\ 20/71$ (2008.01)
$H04W\ 28/02$ (2009.01)

(52) U.S. Cl.
CPC .......... *H04W 28/02* (2013.01); *H04W 28/0242* (2013.01)
USPC ............................ 370/232; 370/235; 370/312

(58) Field of Classification Search
CPC ............ H04W 28/02; H04W 28/0231; H04W 28/0236; H04W 28/0242; H04W 28/0284; H04W 28/0289
USPC ................................. 370/230, 232–235, 312
See application file for complete search history.

(56) References Cited

U.S. PATENT DOCUMENTS 7,907,519 B2 *  3/2011  Songhurst et al. ............ 370/229
8,670,309 B2 *  3/2014  Atkinson et al. .............. 370/230
2004/0114576 A1 *  6/2004  Itoh et al. ...................... 370/352
2007/0076598 A1 *  4/2007  Atkinson et al. .............. 370/229
2007/0147281 A1 *  6/2007  Dale et al. ...................... 370/321
2009/0067335 A1 *  3/2009  Pelletier et al. ................ 370/238
2011/0075563 A1 *  3/2011  Leung et al. ................... 370/236
2012/0039231 A1 *  2/2012  Suri et al. ....................... 370/312
2012/0147750 A1 *  6/2012  Pelletier et al. ............... 370/235
2012/0155275 A1 *  6/2012  Massoulie et al. ............ 370/236
2013/0083656 A1 *  4/2013  Wigell ........................... 370/230

OTHER PUBLICATIONS

M. Handley et al., "RFC 3448," Jan. 2003.
S. Floyd et al., "Equation-Based Congestion Control for Unicast Applications," Proc. of ACM Sigcomm 2000, Aug. 2000.
M. Padhye et al., "Modeling TCP Throughput: A Simple Model and its Empirical Validation," Proc. of ACM Sigcomm 1998, Aug. 1998.

* cited by examiner

*Primary Examiner* — Farah Faroul
(74) *Attorney, Agent, or Firm* — Ronald E. Prass, Jr.; Prass LLP (57) ABSTRACT

A system and method are provided for implementing performance improvements in a multicast protocol for networks that support incipient congestion indications via packet marking in instances of packet loss in the network during time-correlated blockages by providing indications in the physical (PHY) layer. A receiver rate calculation is adjusted so that a loss due to blockage is ignored completely and only packets marked using an Explicit Congestion Notification (ECN) packet marking protocol are treated as losses. Receiver rates are modified based on ECN principles to ignore losses. A NORM receiver rate equation may remain substantially unchanged while a sender is enabled to keep sending at a higher data rate, even in instances of blockage in support of higher system throughputs without defining a completely new receiver rate equation. Time-correlated blockages are not treated as losses.

19 Claims, 3 Drawing Sheets

ECN-ENABLED MULTICAST PROTOCOL FOR WIRELESS COMMUNICATION SYSTEMS UNDER BLOCKAGE

BACKGROUND

1. Field of the Disclosed Embodiments

This disclosure relates to systems and methods for implementing performance improvements in a multicast protocol in instances of packet loss in the network during time-correlated blockages.

2. Related Art

The Internet has become highly dependent on congestion control mechanisms, and particularly Transmission Control Protocol (TCP) congestion control mechanisms, that allow data streams to share bandwidth fairly. Widespread deployment of a transport protocol that does not interact gracefully with the TCP has the potential to raise significant difficulties. These difficulties were once considered an obstacle to effective standardization of reliable multicast protocols.

The NACK-Oriented Reliable Multicast (NORM) protocol is designed to provide end-to-end reliable transport of bulk data objects or streams over generic Internet Protocol (IP) multicast routing and forwarding services. NORM uses a selective, negative acknowledgement (NACK) mechanism for transport reliability and offers additional protocol mechanisms to conduct reliable multicast sessions with limited up front coordination among senders and receivers. A congestion control scheme is specified to allow the NORM protocol to fairly share available network bandwidth with other transport protocols such as TCP. It is capable of operating with both reciprocal multicast routing among senders and receivers and with asymmetric connectivity (possibly a unicast return path) from the senders to receivers. The protocol offers a number of features to allow different types of applications or possibly other higher level transport protocols to utilize its service in different ways.

When using a reliable multicast protocol such as NORM, packet loss due to time-correlated blockage at the physical (PHY) layer is interpreted as congestion loss by the receivers. The receivers then request the sender to throttle data rates on the assumption that there is congestion in the network. When there are multiple receivers that can independently experience blockage, the throughput of the NORM session goes down significantly leading to dramatic system underuse and consequent application performance degradation. NORM includes no built-in mechanism for ECN signaling on congestion.

SUMMARY OF THE DISCLOSED EMBODIMENTS

Previous work on TCP has described using Explicit Congestion Notification (ECN) packet marking by routers to distinguish between loss due to congestion and loss at the PHY layer. ECN notification has been incorporated in the NORM protocol. However, the loss at the PHY layer has been assumed to be random, and not time-correlated such as in instances of blockage for satellite communications.

Those of skill in the art recognize that ECN is an extension to the IP and to the TCP. ECN generally allows end-to-end notification of network congestion without dropping packets. ECN is generally considered to be an optional feature that is only used when both endpoints support its use and are willing to use it. ECN is only effective when supported by the underlying network.

Conventionally, TCP/IP networks signal congestion by dropping packets. This may result in random resending of unacknowledged packets sometimes resulting in unnecessary and burdensome resending of packets thereby inducing a slowing in the throughput of data. When ECN is successfully negotiated, an ECN-aware router may set a mark in the IP header instead of relying on a dropped packet to signal impending congestion. The receiver of the packet echoes the congestion indication to the sender, which reduces its transmission rate as though it detected a dropped packet. In this way the throughput of the system may not be slowed by the sender redundantly and unnecessarily resending packets. Overall, the throughput is, therefore, increased.

With ECN, the congestion is indicated by setting the CE bits at an IP packet and echoing back by the receiver to the transmitter by setting proper bits in the transport layer's protocol header. For example, when using TCP, the congestion indication is echoed back by setting the ECN-Echo (ECE) bit as discussed below.

ECN may use, for example, the two bits to encode four different code points as follows:
  00: Non ECN-Capable Transport—Non-ECT
  10: ECN Capable Transport—ECT(0)
  01: ECN Capable Transport—ECT(1)
  11: Congestion Encountered—CE When both endpoints support ECN, they mark their packets with ECT(0) or ECT(1). If the packet traverses an Active Queue Management (AQM) queue (e.g., a queue that uses Random Early Detection (RED)) that is experiencing congestion and the corresponding router supports ECN, it may change the code point to CE instead of dropping the packet. This act is referred to as "marking" and its purpose is to inform the receiving endpoint of impending congestion. At the receiving endpoint, this congestion indication is handled by the upper layer protocol (transport layer protocol) and needs to be echoed back to the transmitting node in order to signal it to reduce its transmission rate.

Because the CE indication can only be handled effectively by an upper layer protocol that supports it, ECN is used in conjunction with upper layer protocols, e.g., TCP, that support congestion control and, have a method for echoing the CE indication to the transmitting endpoint.

TCP supports ECN using two flags in the TCP header. Those two bits are used to echo back the congestion indication, i.e., to signal the sender to reduce the amount of information it sends, and to acknowledge that the congestion-indication echoing was received. These are the ECE and Congestion Window Reduced (CWR) bits. For ECN to be used, it must be negotiated at connection establishment by including suitable options in the SYN and SYN-ACK segments.

When ECN has been negotiated on a TCP connection, the sender indicates that IP packets that carry TCP segments of that connection are carrying traffic from an ECN Capable Transport by marking them with an ECT code point. This allows intermediate routers that support ECN to mark those IP packets with the CE code point instead of dropping them in order to signal impending congestion.

Upon receiving an IP packet with the Congestion Experienced code point, the TCP receiver echoes back this congestion indication using the ECE flag in the TCP header. When an endpoint receives a TCP segment with the ECE bit, it reduces its congestion window as for a packet drop. It then acknowledges the congestion indication by sending a segment with the CWR bit set. A node keeps transmitting TCP segments with the ECE bit set until it receives a segment with the CWR bit set.

It would be advantageous to provide a system and a method for implementing performance improvements in a multicast protocol for networks that support incipient congestion indications via packet marking in instances of packet loss in the network during time-correlated blockages by providing indications in the physical (PHY) layer.

Exemplary embodiments according to this disclosure may adjust the receiver rate calculation such that a loss due to blockage is ignored completely and only packets marked via ECN are treated as losses.

Exemplary embodiments may modify receiver rates based on ECN principles to ignore all losses. Losses may be due to blockage and congestion. In exemplary embodiments, only ECN-marked packets may be considered as lost packets.

In exemplary embodiments, a NORM receiver rate equation may remain substantially unchanged.

Exemplary embodiments may enable a sender to keep sending at a higher data rate, even in instances of blockage. The disclosed systems and methods may provide higher system throughputs, better network capacity use, and lower data overhead without defining a completely new receiver rate equation.

Exemplary embodiments may not treat loss due to time-correlated blockage as losses. The disclosed systems and methods may thus enable the receivers to calculate the true bandwidth availability.

Exemplary embodiments may provide reliable multicast performance metrics that accurately capture and/or isolate occurrences of blockage.

Exemplary embodiments may enable ECN-capable NORM packets and AQM on NORM traffic.

Exemplary embodiments may extend the NORM protocol to have a built-in congestion control mechanism with ECN markings.

Exemplary embodiments may achieve certain advantages including: (1) Minimizing overhead to facilitate maximum goodput/throughput; (2) Minimizing ACK/NACK; (3) Maximizing heterogeneous link utilization; (4) Maximizing availability of multicast data to receivers; (5) Minimizing effect of route changes; (6) Minimizing effect of blockages; (7) Maximizing ability to scale; and (8) Minimizing sensitivity of performance metrics to change in scale.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for implementing performance improvements in a multicast protocol for networks that support incipient congestion indications via packet marking in instances of packet loss in the network during time-correlated blockages by providing indications in the physical (PHY) layer will be described, in detail, with reference to the following drawings, in which.

DETAILED DESCRIPTION OF THE DISCLOSED EMBODIMENTS

The systems and methods for implementing performance improvements in a multicast protocol for networks that support incipient congestion indications via packet marking in instances of packet loss in the network during time-correlated blockages by providing indications in the physical (PHY) layer according to this disclosure will generally refer to this specific utility for those systems and methods. Exemplary embodiments described and depicted in this disclosure should not be interpreted as being specifically limited to implementation in any particular network configuration, or directed to any particular intended use. In fact, any wireless data packet communication methodology, particularly for satellite communication in wireless networks, which may benefit from the systems and methods according to this disclosure, is contemplated.

Specific reference to, for example, any particular transmission protocol between cooperating wireless devices, including satellite-assisted communications, should be understood as being exemplary only, and not limited, in any manner, to any particular transmission protocol or any particular class of communicating devices. The systems and methods according to this disclosure will be described as being particularly adaptable to wireless communications that are facilitated via satellites, but should not be considered as being limited to only such applications.

Individual features and advantages of the disclosed systems and methods will be set forth in the description that follows, and will be, in part, obvious from the description, or may be learned by practice of the features described in this disclosure. The features and advantages of the systems and methods according to this disclosure may be realized and obtained by means of the individual elements and combinations of those elements as particularly pointed out in the appended claims. While specific implementations are discussed, it should be understood that this is done for illustration purposes only. A person skilled in the relevant art will recognize that other components and configurations may be used without departing from the spirit and scope of the subject matter of this disclosure.

Various aspects of the disclosed embodiments relate to a system and a method for implementing performance improvements in a multicast protocol for networks that support incipient congestion indications via packet marking in instances of packet loss in the network during time-correlated blockages by providing indications in the physical (PHY) layer.

A TCP-friendly rate control (TFRC) protocol was specified in J. Widmer et al., "RFC 3448: TCP Friendly Rate Control (TFRC): Protocol Specification," The Internet Society, January 2003. TFRC is intended for applications that desire lower variation of throughput over time compared to TCP, and it is designed to be reasonably fair when competing for bandwidth with TCP flows. Therefore, it is more suitable for applications such as telephony or streaming media where a relatively smooth sending rate is of importance. The penalty of having smoother throughput than TCP while competing fairly for bandwidth is that TFRC responds slower than TCP to changes in available bandwidth.

TFRC is a receiver based rate control mechanism in which the receiver periodically calculates the rate at which sender should be sending, and feeds this information back to the sender. Generally speaking, TFRC's congestion control mechanism includes: (1) A receiver measures a loss event rate and feeds information regarding the loss event rate back to the sender; (2) The sender uses feedback messages to measure a round-trip time (RTT); (3) The loss event rate and RTT are then fed into a TFRC throughput equation to calculate an acceptable transmit rate; and (4) The sender adjusts its transmit rate to match the calculated acceptable transmit rate.

The TCP throughput is estimated according to the Equation 1. See M. Padhye et al., "Modeling TCP throughput: A simple model and its empirical validation," *Proc. of ACM Sigcomm* 1998, August 1998.

$$X = \frac{s}{RTT\left(\sqrt{\frac{2bp}{3}} + T_o \min\left\{1, \sqrt{\frac{3bp}{8}}\right\} p(1 + 32p^2)\right)}$$ Equation 1 where
X is the transmission rate in bytes/seconds,
s is the packet size in bytes,
RTT is the round-trip time in seconds,
p is the loss event rate,
$T_o$ is the TCP retransmission timeout value in seconds, and
b is the number of packets acknowledged by a single TCP acknowledgment.

RFC 3448 explains that, for many TCP variants, $T_o$ may be set to 4RTT, and b may be set to 1 to yield what the reference considers to be good results. Simplifying Equation 1 with these substitutions results in Equation 2 as follows:

$$X = \frac{s}{RTT\left(\sqrt{\frac{2p}{3}} + 4\sqrt{\frac{3p}{8}} \, p(1 + 32p^2)\right)}$$ Equation 2

For equation-based flows the packet size s is generally fixed and known ahead of time. RTT calculations are accomplished by time-stamping each packet transmitted by the sender and echoed by the receiver, which records its current time in feedback packets.

In implementing equation-based congestion control, it can be important to the calculation to determine the packet loss rate p. The receiver detects a loss by a missing sequence number, or in the case of ECN marking, by an ECN marked packet. The frequency of lost packets (or marked packets) are then determined roughly as follows. The receiver may track the number of packets received between two lost packets for a last nine lost packets. The tracked eight numbers may then be weighted and averaged to determine an average loss interval l in the unit of numbers of packets. The loss event rate may thus be determined by setting p=1/l. This calculation, however, assumes operations over a wired network where all losses may be attributable to congestion.

If the TCP link is a wireless channel, which is prone to additional wireless losses, using ECN marking according to the disclosed methods may enable a TCP sender to react only to congestion by reducing the congestion window to ACK's in which the ECN bit is flipped. In this manner, the routers may be set up such that an ECN-enabled protocol accounts for the congestion on the network, the random losses being only due to the failures in the wireless link, which may cause time-outs. In this scenario, the manner by which the TCP throughput X is derived may be adjusted to yield Equation 3 as follows:

$$X = \frac{s}{RTT\left(\sqrt{\frac{2p_m}{3}} + 4\sqrt{\frac{3p_w}{8}} \, p_w(1 + 32p_w^2)\right)}$$ Equation 3 where $p_m$ stands for the ECN marking rate at the router, and $p_w$ is the rate at which packets are lost on the wireless channel.

Equation 3 is explained as follows. The first term in the denominator comes from TCP cutting its congestion window in half in response to a congestion indicator. Because, in ECN-enabled TCP, this will only happen when an ECN-marked ACK is received a probability for this term may be defined as $p_m$. The second term in Equation 3 originates from the TCP average timeout calculation. Because timeouts are related to actual losses, and they occur only on the wireless channel, a probability for this term may be defined as $p_w$.

The manner in which the receiver may calculate $p_m$ is similar to the calculation of p discussed above, where the receiver calculates the frequency of ECN marked-packets. Calculation of $p_w$, on the other hand, may occur by looking at a rate of lost packets.

When there is blockage in the wireless channel, throughput Equation 3 will hold, at least when in a long-term unblocked state. Therefore, if a receiver can identify that the blockage is not an issue in the channel it can adapt its rate to X as given in Equation 3.

When there is blockage, the receiver may not receive any packets for an extended period of time. A typical blockage may last about 5-10 times RTT. An exact number of packets the receiver will not be able to receive during this period depends on the window size W, and may be excessive if, for example, W=20. Blockage timers may be introduced to receivers to readjust the manner by which $p_m$ and $p_w$ may be calculated under short-term blockage.

Figure 1A:
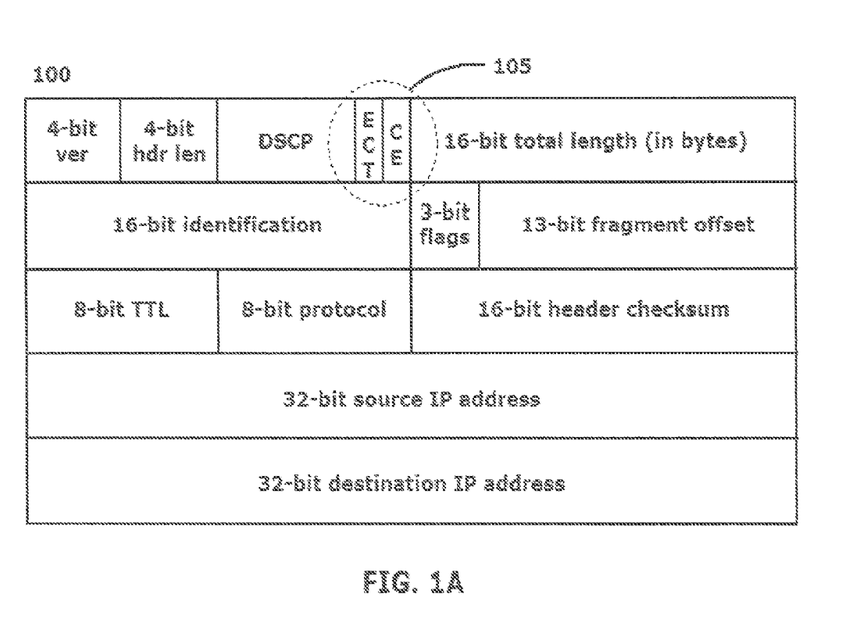
FIGS. 1A and 1B illustrate exemplary methods for ECN packet marking.
Figure 1B:
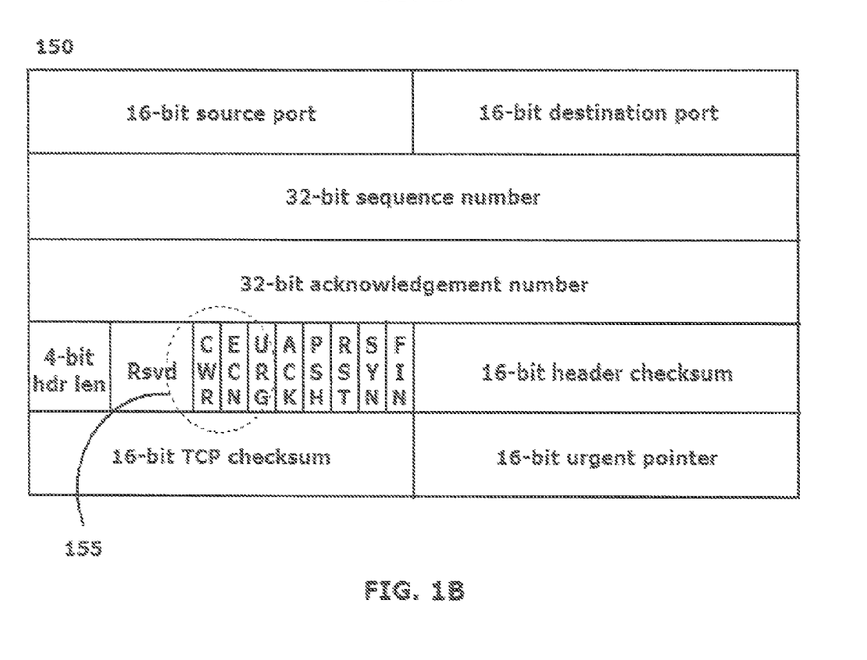

FIGS. 1A and 1B illustrate exemplary methods for ECN packet marking FIG. 1A illustrates an example of an IP header 100 in which the ECT and CE bits for ECN packet marking are highlighted as element 105. FIG. 1B illustrates an example of a TCP header 150 in which the CWR and ECN bits for ECN packet marking are highlighted as element 155.

Figure 2:
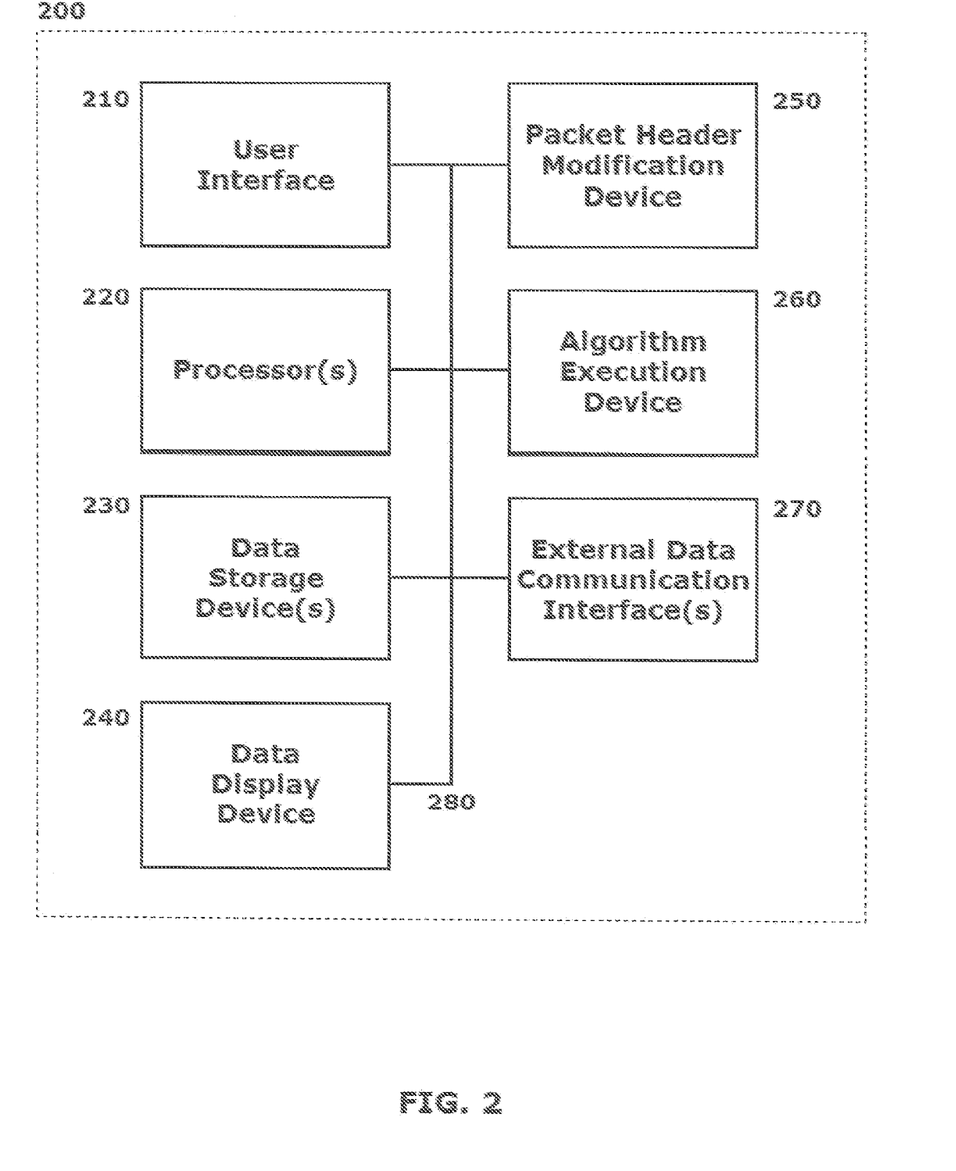
FIG. 2 illustrates a block diagram of an exemplary system for implementing performance improvements in a multicast protocol for networks that support incipient congestion indications via packet marking according to this disclosure.

FIG. 2 illustrates a block diagram of an exemplary system 200 for implementing performance improvements in a multicast protocol for networks that support incipient congestion indications via packet marking according to this disclosure.

The exemplary system 200 may include a user interface 210 by which the user can communicate with the exemplary system 200. The user interface 210 may be configured as one or more conventional mechanisms that permit a user to input information to the exemplary system 200. The user interface 210 may include, for example, a keyboard and/or mouse by which a user can enter data into the exemplary system 200. The user interface 210 may alternatively include (1) a touchscreen with "soft" buttons, which may be configured for use with a compatible stylus; (2) a microphone by which a user may provide oral commands to the exemplary system 200 to be "translated" by a voice recognition program or otherwise; or (3) other like devices for user operation of, and data exchange with, the exemplary system 200. The user interface 210 may be used, for example, to select or deselect an ECN-enabled mode for communications facilitated by the exemplary system 200.

The exemplary system 200 may include one or more processor(s) 220 for individually operating the exemplary system 200 and carrying out processing and control functions such as those that will be described in detail below. Processor(s) 220 may include at least one conventional processor or microprocessor that interprets and executes instructions to execute the algorithms and make the determinations according to the methods of this disclosure.

The exemplary system 200 may include one or more data storage device(s) 230. Such data storage device(s) 230 may be used to store data or operating programs to be used by the exemplary system 200, and specifically the processor 220. Data storage device(s) 230 may include a random access memory (RAM) or another type of dynamic storage device that stores information and instructions for execution by processor(s) 220. Data storage device(s) 230 may also include a read-only memory (ROM), which may include a conventional ROM device or another type of static storage device that stores static information and instructions for processor(s) 220. Further, the data storage device(s) 230 may be integral to the exemplary system 200, or may be provided external to, and in wired or wireless communication with, the exemplary system 200.

The exemplary system 200 may include at least one data display device 240 which may be configured as one or more conventional mechanisms that output information to a user, including a display for alerting a user. The data display device may consist of an output port for connection to a printer, a copier, a scanner, a multi-function device, or a remote storage medium, such as a memory in the form, for example, of a magnetic or optical disk with a corresponding disk drive in order to record rate information for later review.

The exemplary system 200 may also include one or more of a packet header modification device 250 and an algorithm execution device 260, which may operate as a part of a processor 220, in conjunction with a processor 220 and/or a data storage device 260, or as a separate component module or circuit in the exemplary system 200. The packet header modification device 250 and/or the algorithm execution device 260 may include at least a mechanism for enabling an ECN protocol for and/or for executing an algorithm, such as that according to Equation 3 above for implementing performance improvements in a multicast protocol for networks that support incipient congestion (ECN protocol) indications via appropriate packet marking in instances of packet loss in the network during time-correlated blockages.

The exemplary system 200 may include one or more external data communication interface(s) 270 by which the exemplary system 200 may communicate with components external to the exemplary system 200 to receive, for example indications of imminent network congestion, and to control send rates of data packets according to a calculated transmission rate, as discussed above. External data communication interface(s) 270 may include any mechanism that facilitates communication via a network environment within which the exemplary system 200 is employed for implementing performance improvements in a multicast protocol for the network environment. As such, external data communication interface(s) 270 may be appropriately configured and include such other mechanisms as may be appropriate for assisting in communications with other devices and/or systems.

All of the various components of the exemplary system 200, as depicted in FIG. 2, may be connected by one or more data/control busses 280. These data/control busses 280 may provide wired or wireless communication between the various components of the exemplary system 200, whether all of those components are housed integrally as a single system, or are otherwise external to and in wired or wireless communication with the exemplary system 200.

It should be appreciated that, although depicted in FIG. 2 as an integral unit, the various disclosed elements of the exemplary system 200 may be arranged in any combination of sub-systems as individual components or combinations of components, integral to a single unit, or external to, and in wired or wireless communication with the single unit of the exemplary system 200. In other words, no specific configuration as an integral unit or as a support unit is to be implied by the depiction in FIG. 2.

It should also be appreciated that the system storage and processing functions described above, given the proper inputs, may be carried out in system hardware circuits, software modules or instructions or firmware, or in varying combinations of these.

Figure 3:
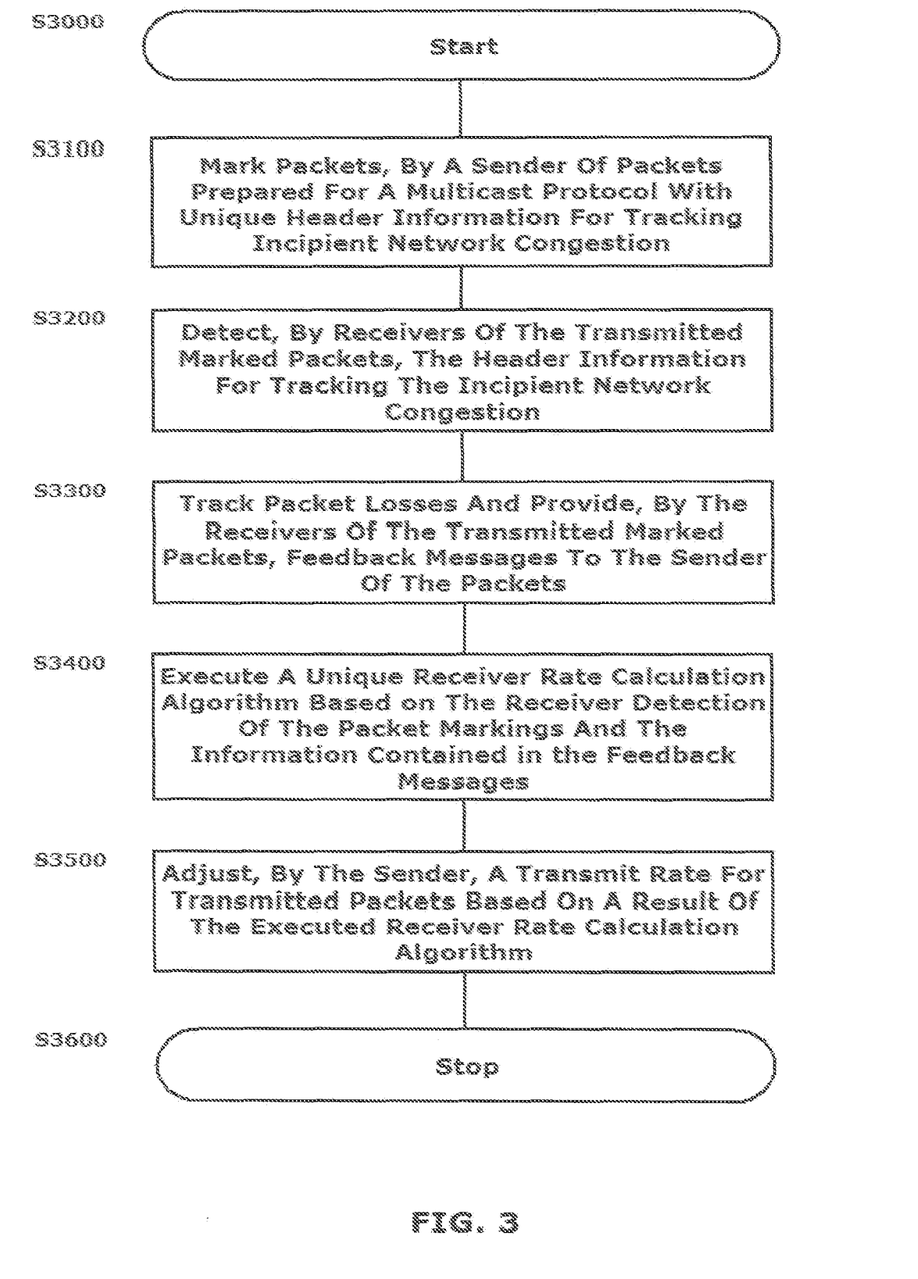
FIG. 3 illustrates a flowchart of an exemplary method for implementing performance improvements in a multicast protocol for networks that support incipient congestion indications via packet marking according to this disclosure.

The disclosed embodiments may include a method for implementing performance improvements in a multicast protocol for networks that support incipient congestion indications via packet marking in instances of packet loss in the network during time-correlated blockages. FIG. 3 illustrates a flowchart of such an exemplary method. As shown in FIG. 3, operation of the method commences at Step S3000 and proceeds to Step S3100.

In Step S3100, a sender of packets prepared for multicast protocol may be marked, by the sender with unique header information that is intended to track incipient network congestion. The unique header information may, for example, employ an ECN packet market protocol in a TCP header in the manner discussed above. Operation of the method proceeds to Step S3200.

In Step S3200, one or more receivers of the marked packets may detect the header information for tracking the incipient network congestion. Operation of the method proceeds to Step S3300.

In Step S3300, the one or more receivers of the marked packets track packet losses and provide feedback messages to the sender of the packets. Packet losses may be tracked and averaged over a number of packet transmissions with numbers of correctly received patents providing a basis for the information on packet losses to be fed back to the sender. The sender may use the feedback messages to calculate a round-trip time for information sent from the sender, received by the receiver and returned to the sender. Operation of the method proceeds to Step S3400.

In Step S3400, a unique receiver rate calculation algorithm may be executed to determine a transmit rate for the sender to transmit the packets. The unique receiver rate calculation algorithm may be in the form of Equation 3 above. At a minimum, the unique receiver rate calculation algorithm should be of a nature to ignore packet losses that may be attributable to blockage. Operation of the proceeds to Step S3500.

In Step S3500, a transmission rate for packets transmitted by the sender may be adjusted according to the results of the executed receiver rate calculation algorithm. Operation of the method proceeds to Step S3600, where operation of the method ceases.

The disclosed embodiments may include a non-transitory computer-readable medium storing instructions which, when executed by a processor, may cause the processor to execute the steps of an exemplary method as outlined above.

The above-described exemplary system and method reference certain conventional components and known communications processes and protocols to provide a brief, general description of a suitable communication and processing environment in which the subject matter of this disclosure may be implemented for familiarity and ease of understanding. As indicated above, although not required, embodiments of the disclosure may be provided, at least in part, in a form of hardware circuits, firmware or software computer-executable instructions to carry out the specific functions described, such as program modules, being executed by a processor. Generally, program modules include routine programs, objects, components, data structures, and the like that perform particular tasks or implement particular data types.

Those skilled in the art will appreciate that other embodiments of the disclosed subject matter may be practiced in communication network environments with many types and configurations of communication equipment and supporting computer system configurations.

Embodiments may also be practiced in distributed computing and network communicating environments where tasks are performed by local and remote processing devices that are linked to each other by hardwired links, wireless links, or a combination of both through a communication network. In a distributed computing and/or network communicating environment, program modules may be located in both local and remote memory storage devices, or may be remotely located for wireless access by an exemplary system or method according to this disclosure.

Embodiments within the scope of the present disclosure may also include computer-readable media having stored computer-executable instructions or data structures that can be accessed, read and executed a compatible wired or wireless data reader. Such computer-readable media can be any available media that can be accessed by a processor, general purpose or special purpose computer in, or in communication with, a communicating device. By way of example, and not limitation, such computer-readable media can comprise RAM, ROM, EEPROM, CD-ROM, flash drives, data memory cards or other analog or digital data storage device that can be used to carry or store desired program elements or steps in the form of accessible computer-executable instructions or data structures. When information is transferred or provided over a network or another communications connection, whether wired, wireless, or in some combination of the two, the receiving processor properly views the connection as a computer-readable medium. Thus, any such connection is properly termed a computer-readable medium. Combinations of the above should also be included within the scope of the computer-readable media for the purposes of this disclosure.

Computer-executable instructions include, for example, non-transitory instructions and data that can be executed and accessed respectively to cause a communicating device, or a processor in such a communicating device, to perform certain of the above-specified functions, individually, or in combination. Computer-executable instructions also include program modules that are remotely stored for access by a computing device to be executed by processors in the communicating device when that device is caused to communicate in a network environment.

The exemplary depicted sequence of executable instructions or associated data structures represents one example of a corresponding sequence of acts for implementing the functions described in the steps. No specific order is to be implied by the depiction presented in FIG. 3 and the accompanying description except where a specific method step may be considered a necessary precondition to execution of any other method step.

Although the above description may contain specific details, they should not be construed as limiting the claims in any way. Other configurations of the described embodiments of the disclosed systems and methods are part of the scope of this disclosure. For example, the principles of the disclosure may be applied to each individual user where each user may individually deploy such a system. This enables each user to use the benefits of the disclosure even if any one of the large number of possible applications do not need a specific aspect of the functionality described and depicted in this disclosure. In other words, there may be multiple instances of the components each processing the content in various possible ways. It does not necessarily need to be one system used by all end users. Accordingly, the appended claims and their legal equivalents should only define the disclosure, rather than any specific examples given.

We claim:

1. A method for controlling packet transmission rates, comprising:

providing at least one unique marking bit in a physical layer of a plurality of packets to be transmitted by a single sender to a plurality of receivers according to a multicast protocol, the at least one unique marking bit being an Explicit Congestion Notification (ECN) packet marking;

recognizing the at least one unique marking bit in the physical layer of the plurality of packets as received by at least one of the plurality of receivers;

tracking packet losses by the at least one of the plurality of receivers by detecting a loss of an ECN marked packet by the at least one of the plurality of receivers;

providing feedback messages to the single sender including information regarding packet losses for the plurality of receivers based on the tracking;

executing, by a processor, a rate calculation algorithm based on the provided feedback messages; and adjusting, with the processor, a transmission rate for the single sender based on a result of the rate calculation algorithm, the result of the rate calculation algorithm ignoring losses attributable to at least one blockage in a wireless communication channel.

2. The method of claim 1, the physical layer being a transmission Control Protocol (TCP) layer.

3. The method of claim 1, the multicast protocol being a NACK-Oriented Reliable Multicast (NORM) protocol.

4. The method of claim 1, the tracking the packet losses by the at least one of the plurality of receivers comprising determining a packet loss rate for the at least one of the plurality of receivers.

5. The method of claim 4, the packet loss rate for the at least one of the plurality of receivers being determined by tracking a number of packets received between each sequential pair of lost ECN-marked packets across a plurality of sequential pairs of lost ECN-marked packets;

determining an average loss interval l in a unit of numbers of packets based on a weighted average of a number of packets received between each sequential pair of lost ECN-marked packets across a plurality of sequential pairs of lost ECN-marked packets within the unit number of packets; and setting the packet loss rate as 1/l.

6. The method of claim 5, further comprising calculating a round trip time based on the feedback messages provided to the single sender, the rate calculation algorithm referencing at least the packet loss rate and the calculated round trip time.

7. The method of claim 6, the rate calculation algorithm being represented as $$X = \frac{s}{RTT\left(\sqrt{\frac{2p_m}{3}} + 4\sqrt{\frac{3p_w}{8}}\, p_w(1+32p_w^2)\right)}$$

where:
X is the transmission rate in bytes/seconds,
s is a packet size in bytes,
RTT is the round trip time in seconds,
$p_m$ is the packet loss rate for ECN marked packets, and
$p_w$ is a packet loss rate for packets lost in the wireless communication channel.

8. A system for controlling packet transmission rates, comprising:
a packet header modification device that provides at least one unique marking bit in a physical layer of a plurality of packets to be transmitted by a single sender to a plurality of receivers according to a multicast protocol, the at least one unique marking bit in the physical layer being an Explicit Congestion Notification (ECN) packet marking;
an external communication interface for sending packets according to the multicast protocol and for receiving feedback messages from the plurality of receivers that indicate that at least one of the plurality of receivers (1) recognizes the at least one unique marking bit in the physical layer as received by the at least one of the plurality of receivers, and (2) tracks packet losses by the at least one of the plurality of receivers by detecting a loss of an ECN marked packet by the at least one of the plurality of receivers, the feedback messages including information regarding packet losses for the plurality of receivers based on the tracking; and
a processor that is programmed to
execute a rate calculation algorithm based on the received feedback messages, and
adjust a transmission rate for the single sender based on a result of the rate calculation algorithm,
the result of the rate calculation algorithm ignoring losses attributable to at least one blockage in a wireless communication channel.

9. The system of claim 8, the physical layer being a transmission Control Protocol (TCP) layer.

10. The system of claim 8, the multicast protocol being a NACK-Oriented Reliable Multicast (NORM) protocol.

11. The system of claim 8, the tracking the packet losses by the at least one of the plurality of receivers comprising determining a packet loss rate for the at least one of the plurality of receivers.

12. The system of claim 11, the packet loss rate for the at least one of the plurality of receivers being determined by
tracking a number of packets received between each sequential pair of lost ECN-marked packets across a plurality of sequential pairs of lost ECN-marked packets;
determining an average loss interval l in a unit of numbers of packets based on a weighted average of a number of packets received between each sequential pair of lost ECN-marked packets across a plurality of sequential pairs of lost ECN-marked packets within the unit number of packets; and
setting the packet loss rate as 1/l.

13. The system of claim 12, the processor being further programmed to calculate a round trip time based on the feedback messages provided to the single sender, the rate calculation algorithm referencing at least the packet loss rate and the calculated round trip time.

14. The system of claim 13, the rate calculation algorithm being represented as $$X = \frac{s}{RTT\left(\sqrt{\frac{2p_m}{3}} + 4\sqrt{\frac{3p_w}{8}}\, p_w(1+32p_w^2)\right)}$$

where:
X is the transmission rate in bytes/seconds,
s is a packet size in bytes,
RTT is the round trip time in seconds,
$p_m$ is the packet loss rate for ECN marked packets, and
$p_w$ is a packet loss rate for packets lost on the wireless communication channel.

15. A non-transitory computer-readable medium storing instructions which, when executed by a processor, cause the processor to execute a method, comprising:
providing at least one unique marking bit in a physical layer of a plurality of packets to be transmitted by a single sender to a plurality of receivers according to a multicast protocol, the at least one unique marking bit in the physical layer being an Explicit Congestion Notification (ECN) packet marking;
recognizing the at least one unique marking bit in the physical layer of the plurality of packets as received by at least one of the plurality of receivers;
tracking packet losses by the at least one of the plurality of receivers by detecting a loss of an ECN marked packet by the at least one of the plurality of receivers;
providing feedback messages to the single sender including information regarding packet losses for the plurality of receivers based on the tracking;
executing a rate calculation algorithm based on the provided feedback messages; and
adjusting a transmission rate for the sender based on a result of the rate calculation algorithm,
the result of the rate calculation algorithm ignoring losses attributable to at least one blockage in a wireless communication channel.

16. The non-transitory computer-readable medium of claim 15, the tracking the packet losses by the at least one of the plurality of receivers comprising determining a packet loss rate for the at least one of the plurality of receivers.

17. The non-transitory computer-readable medium of claim 16, the packet loss rate for the at least one of the plurality of receivers being determined by
tracking a number of packets received between each sequential pair of lost ECN-marked packets across a plurality of sequential pairs of lost ECN-marked packets;
determining an average loss interval l in a unit of numbers of packets based on a weighted average of a number of packets received between each sequential pair of lost ECN-marked packets across a plurality of sequential pairs of lost ECN-marked packets within the unit number of packets; and
setting the packet loss rate as 1/l.

18. The non-transitory computer-readable medium of claim 17, the method further comprising calculating a round trip time based on the feedback messages provided to the single sender, the rate calculation algorithm referencing at least the packet loss rate and the calculated round trip time.

19. The non-transitory computer-readable medium of claim 18, the rate calculation algorithm being represented as $$X = \frac{s}{RTT\left(\sqrt{\frac{2p_m}{3}} + 4\sqrt{\frac{3p_w}{8}}\, p_w(1+32p_w^2)\right)}$$

where:
X is the transmission rate in bytes/seconds,
s is a packet size in bytes,
RTT is the round trip time in seconds,
$p_m$ is the packet loss rate for ECN marked packets, and
$p_w$ is a packet loss rate for packets lost in the wireless communication channel.

* * * * *

UNITED STATES PATENT AND TRADEMARK OFFICE
CERTIFICATE OF CORRECTION

Page 1 of 1

PATENT NO.        : 8,923,123 B2
APPLICATION NO.   : 13/668115
DATED             : December 30, 2014
INVENTOR(S)       : Amit Kulkarni et al.

It is certified that error appears in the above-identified patent and that said Letters Patent is hereby corrected as shown below:

On the Title page, Item (72)

Please correct the spelling of the fourth inventor's name as follows:

Anshul Kantawala

Signed and Sealed this
Fifth Day of May, 2015

Michelle K. Lee
*Director of the United States Patent and Trademark Office*